United States Patent Office 3,446,241
Patented May 27, 1969

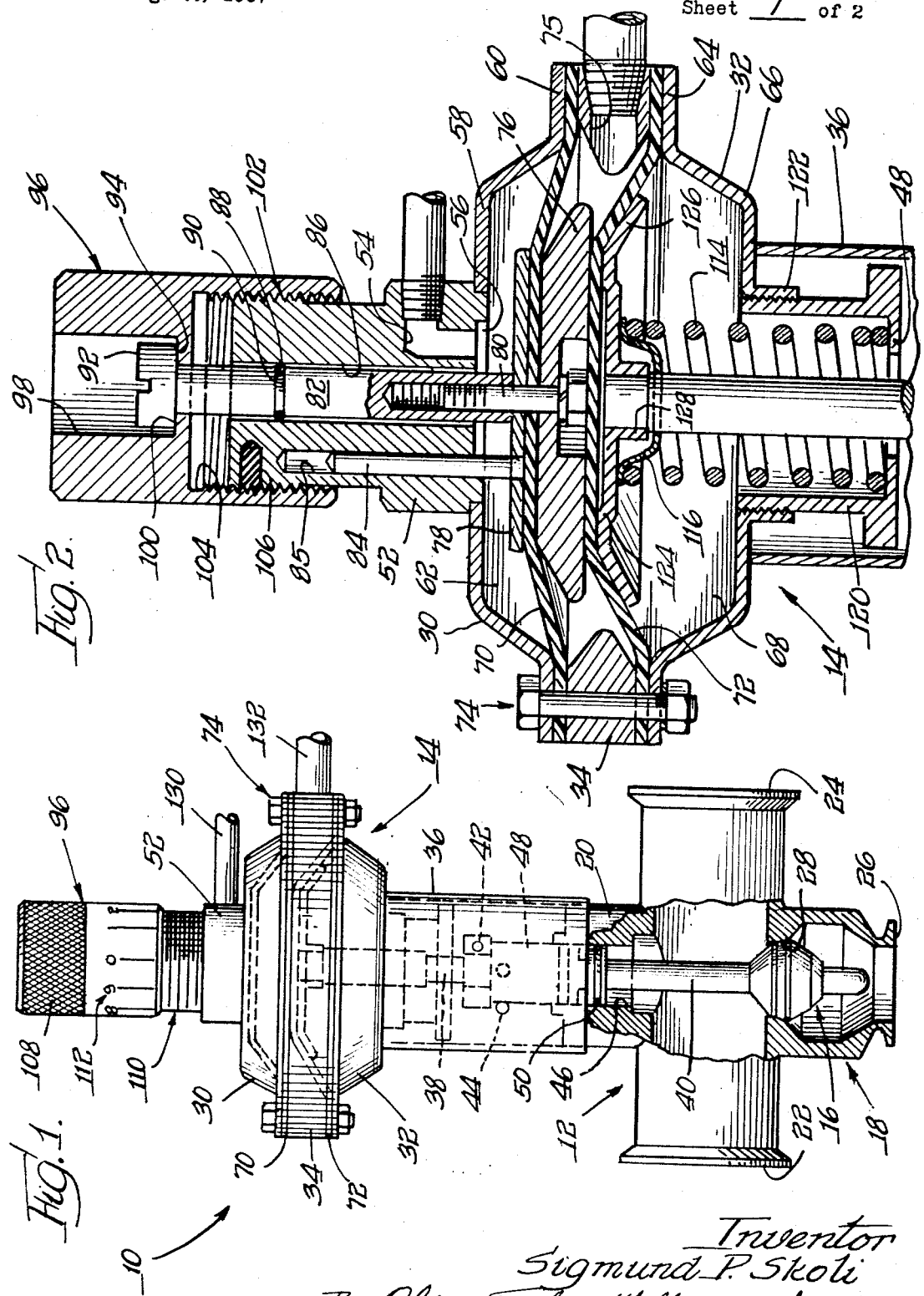

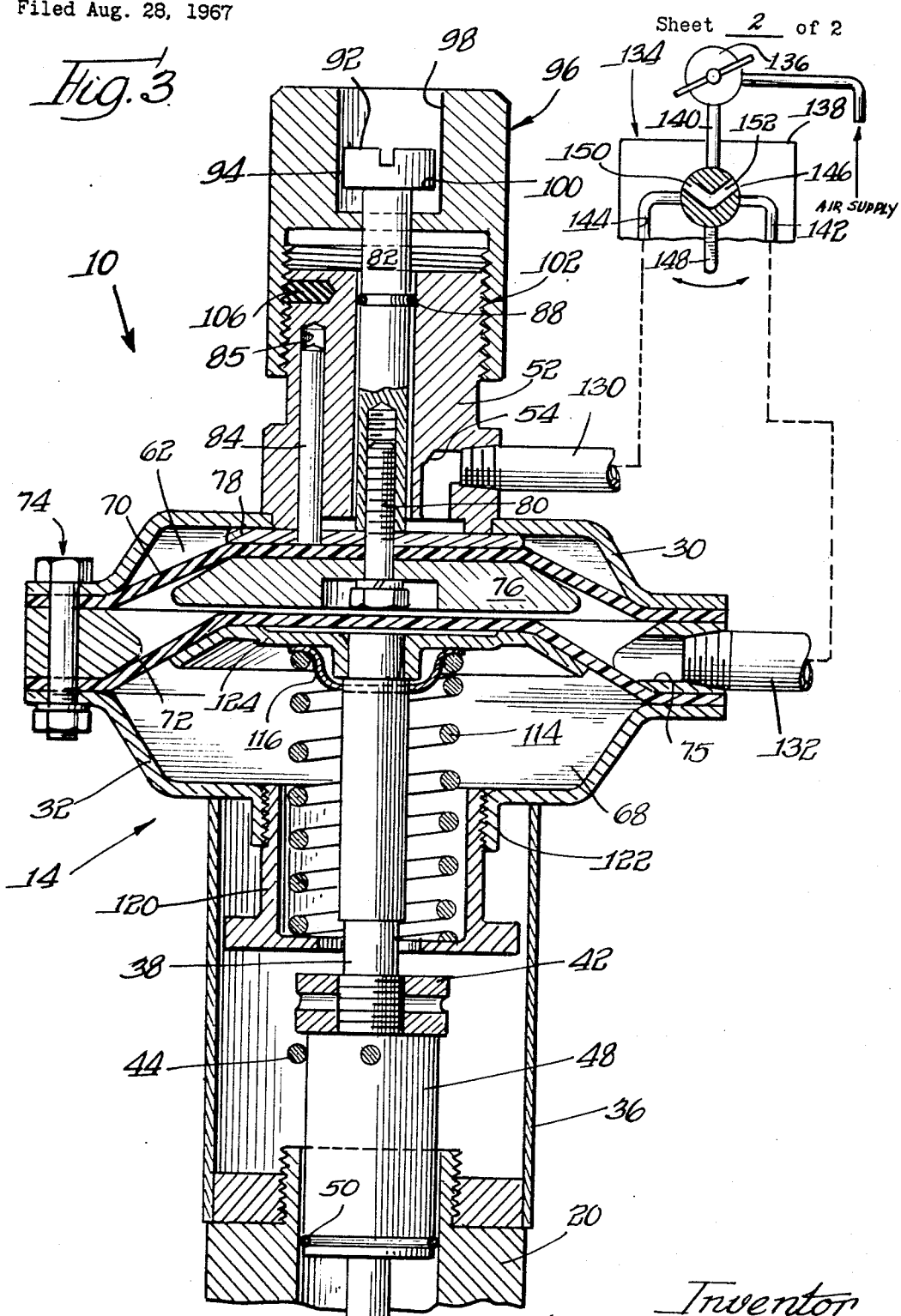

3,446,241
FLOW CONTROL VALVE WITH PLURAL DIAPHRAGM OPERATOR
Sigmund P. Skoli, Elmwood Park, Ill., assignor to Mojonnier Bros. Co., Chicago, Ill., a corporation of Illinois
Filed Aug. 28, 1967, Ser. No. 663,610
Int. Cl. E03b 7/07; F16k 37/00; F17d 3/00
U.S. Cl. 137—553                                5 Claims

ABSTRACT OF THE DISCLOSURE

A fluid-actuated valve operator in which a pair of valve casings and a medially disposed spacer ring define a diaphragm chamber. Flexible diaphragms are secure respectively between each of the casings and the spacer ring. One of the casings and the spacer ring are perforated to admit control fluid for selectively manipulating the two diaphragms and thereby the associated valve element.

---

This invention relates generally to valves for controlling the flow of fluids.

In the past, numerous types of valves have been arranged to open or close a fluid line and to provide coarse regulation of flow between the extreme positions. Other types of valves have heretofore been arranged to regulate flow in a very precise manner. The former type of valve does not customarily achieve fine regulation, and the latter type of valve does not ordinarily afford efficient closing or an opportunity for full flow conditions. An important object of the present invention is therefore to provide a valve having the desirable capabilities of both of the aforesaid types of valves.

A more specific object of the invention is to provide a valve arrangement which is capable of fully open, fully closed and precisely regulated intermediate flow.

Another object of the invention is to provide a valve that is easy to install, operate and to maintain.

Still another object of the invention is to provide a valve of the type described in which the regulated flow is easily and precisely adjusted.

These and other objects and features of the invention will become more apparent from a consideration of the following descriptions.

In order that the principles of the invention may be readily understood, a single embodiment thereof is shown in the accompanying drawings wherein:

FIG. 1 is an elevational view of a valve arrangement constructed in compliance with the invention;

FIG. 2 is an enlarged, longitudinal sectional view showing the valve operating diaphragms and related structure employed in the arrangement of FIG. 1, the parts being shown in the metered flow position; and FIG. 3 is a view similar to the showing of FIG. 1 but illustrating the valve in its closed condition and indicating appropriate control circuitry in schematic form.

Referring now in detail to the drawings, specifically to FIG. 1, a valve arrangement indicated generally by the reference numeral 10 is constructed in compliance with the present invention to comprise a valve body 12, a valve operating assembly 14 and a valve element 16. The valve body 12 comprises a T fitting 18 and a neck 20 which connects the T fitting to the valve operating assembly 14. In addition, the T fitting 18 has aligned connection ends 22 and 24 and a lateral connection end 26. In compliance with conventional practice, the connection ends 22, 24 and 26 are tubular in nature and merge internally of the fitting to form three confluent passageways. Furthermore, the T fitting 18 includes internally an annular valve seat 28 located in the lateral connection end 26 and contoured to cooperate with the valve element 16 in controlling flow through the valve body 12. In practice, one of the aligned connection ends is plugged so that the remaining aligned end and the lateral connection end 26 may serve as the inlet and outlet to the valve body.

The valve operating assembly 14 comprises an upper valve casing 30, a lower valve head 32, a spacer ring 34 between the valve heads, and a tubular throat 36. Throat 36 extends from the lower valve casing 32 surrounding an operating stem 38 and telescopingly receives the neck 20 of valve body 12. In order to make connection with the operating stem 38, the valve element 16 is mounted on a valve stem 40, coupling of stems 38 and 40 being achieved by means of a nut 42 and a spring clip 44. The neck 20 of valve body 12 is fashioned with a cylindrical bore 46 to pass the valve stem 40; and in order to confine the transmitted liquid to the T fitting 18, a piston 48 is mounted on the valve stem 40 and a toroidal gasket 50 is disposed in a peripheral groove formed in the piston 48 to wipe the walls of bore 46.

Turning to FIG. 2, the upper valve casing 30 is shown connected to an upstanding boss 52 which is fashioned with an L-shaped passageway or conduit 54 that opens through a central aperture 56 in the valve casing. The upper valve casing itself includes an inverted pan-like portion 58 and an annular distal flange 60, portion 58 defining a cavity or space 62 and flange 60 overlying the spacer ring 34. Similarly, the lower valve casing 32 includes a peripheral flange 64 and a pan-like portion 66 which defines a cavity or space 68, space 68 cooperating with space 62 in establishing a diaphragm chamber. The distal edge of a substantially flat, flexible diaphragm 70 is disposed between flange 60 and the upper surface of spacer ring 34; and the distal edge of a second, substantially flat, flexible diaphragm 72 is disposed between flange 64 and the lower surface of spacer ring 34. In order to compress the edges of these diaphragms and seal the diaphragm chamber, nut-and-bolt assemblies 74 are disposed in aligned bores spaced at arcuate intervals about the flanges 60 and 64 and the spacer ring 34. For purposes which will be described more fully hereinafter, the spacer ring 34 has a laterally opening passageway or conduit 75.

The central portion of diaphragm 70 is confined between a diaphragm plate 76 and a retainer plate 78, plates 76 and 78 comprising diaphragm positioning means. In addition, a bolt 80 passes through the plates 76 and 78 to engage threadedly a stop pin 82. To insure vertical motion, a guide pin 84 is welded or otherwise suitably secured to the retainer plate 78; and a cooperating bore 85 is fashioned in the body of boss 52 to receive the guide pin 84 in a snugly slidable manner. The boss 52 is also provided with a central bore 86 which admits the stop pin 82; and advantageously, a toroidal basket 88 is located in a peripheral groove 90 formed in stop pin 82 for sealing engagement with the walls of bore 86.

In order to establish a stop surface, the stop pin 82 is provided with a terminal enlargement or head 92 having a radially outwardly extending, annular surface 94. Cooperatively, a metering knob 96 surrounds the upper end of stop pin 82 and is fashioned with an upwardly opening bore 98 that terminates at its inner end in an annular transverse wall 100. The wall 100 confronts stop surface 94 and is abutted by the stop surface 94 in establishing the downward limit for movement of stop pin 82 and, therefore, the downward limit in the movement of plates 76 and 78 together with the diaphragm 70 confined therebetween. In order that the limit position of stop pin 82 may be selectively adjusted, the metering knob 96 is progressively engageably mounted on the boss 52 by means of cooperating screw threads 102 fashioned on the outside wall of the upper end of the boss and on the inside wall of a cylindrical cavity 104 opening from the lower end of the knob. Advantageous, a friction lock is provided by means of a nylon insert 106 located in a hole drilled radially in the boss 52 in the threaded region.

Reconsidering FIG. 1 for the moment, the metering knob 96 includes an external, knurled region 108 for facility in manual adjustment of the stop or limit position. In addition, the position of this limit or stop and therefore the orifice size in the metered flow condition of the valve arrangement, which will be described more fully hereinafter, is visually indicated by means of graduated indicia 110 provided on the exterior surface of boss 52 and cooperating indicia 112 provided on the external surface of metering knob 96 below the knurled region 108.

In compliance with the present invention, the valve element is biased toward the valve seat 28 and the diaphragms 72 and 70 are biased generally toward the boss 52. Returning to FIG. 2, the means for achieving this bias or urging includes a compression spring 114 which is confined in a stressed condition between a centering washer 116 and a radially inwardly projecting flange 118 of a tubular spring retainer 120. Both the washer 116 and the flange 118 are centrally perforated to pass the operating stem 28, and the spring retainer 120 is fixed in position by means of a depending sleeve 122 which projects downwardly from the lower valve head 32, spring retainer 120 engaging sleeve 122 in threaded relationship for security in mounting. A press fit may also be employed in fastening retainer 120 to sleeve 122; and other means of fastening the spring retainer to the sleeve may, of course, be utilized. To protect the diaphragm 72 and spread the engaging force of stem 38, a diaphragm plate 124 having a deflected marginal edge 126 is secured to the upper end of stem 38 by means of a collar 128; and in order to control motion of the operating stem 38 against the bias of spring 114, a control fluid such as air under pressure, is introduced selectively between the upper valve casing 30 and diaphragm 70 or between the diaphragms 70 and 72. Correspondingly, the outer ends of passageways 54 and 75 are threaded, as shown in FIG. 2, to receive the cooperatively threaded ends of air pipes 130 and 132 respectively, as is shown in FIG. 1.

Having thus described one construction of the invention, it will be valuable now to describe how the illustrated embodiment operates. Assuming that the valve arrangement 10 has been installed in a fluid line so that the transmitted liquid passes through the valve body 12 from one of the end connections 22 and 24 to the lateral connection 26, for example, termination of flow will be achieved by depressuring both conduits 54 and 75. With air pressure removed from both diaphragm 70 and diaphragm 72, the compression spring 114 will urge diaphragm plate 124 forcibly against diaphragm 72, lifting diaphragm 72 against diaphragm plate 76 and thereby retainer plate 78 toward the inner surface of upper valve casing 30. This condition of the valve operating assembly 14 is shown in FIG. 3 and is associated with valve element 16 sealingly engaging the valve seal 28.

In order to dispose the valve element 116 in the fully open position, air under a suitable pressure, such as 20 p.s.i.g., is introduced between the diaphragms 70 and 72 through air pipe 132 and conduit 75. This pressurized air tends to hold the retainer plate 78 adjacent the inner surface of valve casing 30 while urging diaphragm 72 forcibly against the diaphragm plate 124 whereby to compress the spring 114 and direct valve element 16 to the end of its travel away from valve seat 28.

When metered flow through the valve body 12 is desired, pressurized air will be excluded from the air pipe 132 and introduced through air pipe 130 and passageway 54 to the cavity 62 between diaphragm 70 and upper valve casing 30. This condition of the valve arrangement is shown in FIG. 2. There, it will be noted that the downward movement of diaphragm 70 and the plates 76 and 78 is arrested by engagement of stop surface 94 and transverse wall 100. The plate 76, in its arrested position, serves to locate diaphragm 72 and diaphragm plate 124; and since operating stem 38 and diaphragm plate 124 are biased toward plates 76 by means of the spring 114, the valve element 16 which is attached to the operating stem is likewise disposed in a selected position spaced a predetermined distance from valve seat 28. As will be recognized, this selected or metering position of the valve element is readily adjusted by regulating the axial position of wall 100, it being recalled that the position of wall 100 is selected by rotating the metering knob 96. The particular position of wall 100 and the corresponding position of the valve element 16 relative to the seat 28 will, of course, be indicated by the configuration of indicia 110 and 112.

Thus, the valve arrangement 10 is capable of achieving a fully closed position, a fully open position, and a precisely determined intermediate position. This type of control is especially valuable in various types of processing equipment. For example, such control is highly desirable in the by-pass line to an evaporator. During normal operation of the evaporator, it is necessary to by-pass a fixed amount of product, as by means of the metering, intermediate condition of valve arrangement 10. During certain phases of evaporator clean-up procedures, it is desirable that the by-pass line be completely closed, as by the completely closed condition of the valve arrangement 10. During other phases of the evaporator clean-up procedure, it is desirable that the by-pass line be completely open to permit high velocity flow of liquid through the by-pass system. This latter condition can be achieved by the fully open configuration of valve arrangement 10. Similar utility is found in beverage filling operations.

An exemplary control circuit for operating the valve arrangement 10 is suggested in FIG. 3. There, a valve 134 is shown controlling the flow of air through a regulator 136 to the air pipes 130 and 132. Valve 134 includes a body 138 having a passageway 140 which connects with the regulator 136, a passageway 142 which connects with air pipe 132, and a passageway 144 which connects with the air pipe 130. A rotatable valve element 146 is positioned by means of a manual operating handle 148, and the valve element 146 is fashioned with intersecting, relatively angulated passageways 150 and 152.

When the valve element 146 is disposed in the condition shown in FIG. 3, that is with the passageway 140 obstructed, pressurized air is cut off from the air pipes 130 and 132, releasing the valve arrangement 10 to the control of compression spring 114. On the other hand, the valve element 146 may be manipulated to bring passageway 150 into communication with passageway 144 and passageway 152 into communication with passageway 140, thus energizing air pipe 130 with pressurized control fluid. Similarly, valve element 146 may be rotated to bring passageway 152 into communication with passageway 142 and passageway 150 into communication with passageway 140, thus energizing air pipe 132 with a flow of pressurized control fluid.

The invention is claimed as follows:

1. A valve arrangement comprising: first valve casing means having a cavity and first conduit means in communication with said cavity; second valve casing means having a cavity cooperating with said first mentioned cavity in defining a diaphragm chamber; ring means disposed between said first and second valve casing means encircling said diaphragm chamber and including second conduit means opening therethrough; first flexible diaphragm means secured between said first valve casing means and said ring means to respond to control fluid from said first conduit means; second flexible diaphragm means secured between said ring means and said second valve casing means to respond to control fluid from said second conduit means; diaphragm positioning means fastened to said first diaphragm; stop means coacting between said diaphragm positioning means and said first valve casing means for limiting movement of said first diaphragm in one direction; and guide means acting between said first valve casing means and said diaphragm positioning means to direct movement of said positioning means.

2. A valve arrangement according to claim 1 which further comprises first and second progressively engageable means disposed respectively on said stop means and on said first valve casing means for adjustably positioning said stop means; and friction lock means acting between said first and second progressively engageable means to secure a selected position of engagement therebetween.

3. A valve arrangement according to claim 2 wherein said progressively engageable means comprise mating male and female screw threads.

4. A valve arrangement according to claim 2 which further comprises first, graduated indicia means on one of said stop means and said first valve casing means and second indicia means on the other of said stop means and said first valve casing means cooperating with said first indicia means to indicate the relative position of adjustment of said stop means.

5. A valve arrangement according to claim 1 which further comprises fluid circuit means including a control valve connected to said first and second conduit means for alternately directing control fluid thereto whereby to actuate said first and second diaphragm means selectively.

References Cited

UNITED STATES PATENTS

| | | | |
|---|---|---|---|
| 3,085,592 | 4/1962 | Zajac et al. | 137—556 |
| 3,112,959 | 12/1963 | Kateley | 92—63 X |
| 3,155,365 | 11/1964 | Hartung et al. | 251—60 X |
| 3,175,473 | 3/1965 | Boteler et al. | 251—61 X |
| 3,177,779 | 4/1965 | Dobrikin et al. | 92—63 X |

ARNOLD ROSENTHAL, *Primary Examiner.*

U.S. Cl. X.R.

92—13, 48, 64; 251—61.4, 60